(12) United States Patent
Baxter et al.

(10) Patent No.: US 10,537,843 B2
(45) Date of Patent: Jan. 21, 2020

(54) PROCESS FOR COMPONENT SEPARATION UTILIZING MISCIBILITY DEPRESSION NEAR A FREEZING POINT

(71) Applicants: Larry Baxter, Orem, UT (US); Kyler Stitt, Lindon, UT (US); Stephanie Burt, Provo, UT (US); Christopher Hoeger, Provo, UT (US); Eric Mansfield, Spanish Fork, UT (US); Nathan Davis, Bountiful, UT (US)

(72) Inventors: Larry Baxter, Orem, UT (US); Kyler Stitt, Lindon, UT (US); Stephanie Burt, Provo, UT (US); Christopher Hoeger, Provo, UT (US); Eric Mansfield, Spanish Fork, UT (US); Nathan Davis, Bountiful, UT (US)

(73) Assignee: Hall Labs LLC, Provo, UT (US)

( * ) Notice: Subject to any disclaimer, the term of this patent is extended or adjusted under 35 U.S.C. 154(b) by 213 days.

(21) Appl. No.: 15/496,307

(22) Filed: Apr. 25, 2017

(65) Prior Publication Data
US 2018/0306501 A1    Oct. 25, 2018

(51) Int. Cl.
*B01D 53/00*    (2006.01)
*B01D 17/02*    (2006.01)

(52) U.S. Cl.
CPC ........... *B01D 53/002* (2013.01); *B01D 17/02* (2013.01)

(58) Field of Classification Search
CPC ........ F25J 3/08; F25J 2215/80; F25J 2215/04; F25J 2205/02; F25J 2270/90; C02F 1/22; B01D 19/0042; B01D 17/044; B01D 17/042; B01D 17/041; B01D 17/0214; B01D 17/02; B01D 17/045; B01D 17/0217; B01D 17/028; B01D 2257/80; B01D 2257/70; B01D 2257/602; B01D 2257/504; B01D 2257/408; B01D 2257/404; B01D 2257/304; B01D 2257/302
See application file for complete search history.

(56) References Cited

U.S. PATENT DOCUMENTS

| | | | | |
|---|---|---|---|---|
| 2,765,045 A | * | 10/1956 | Meyers | B01D 19/00 95/176 |
| 3,250,081 A | * | 5/1966 | Othmer | B01D 9/0009 62/535 |
| 2014/0075985 A1 | * | 3/2014 | McKay | B01D 53/265 62/618 |
| 2017/0319984 A1 | * | 11/2017 | Oshinowo | B01D 21/30 |

* cited by examiner

*Primary Examiner* — Emmanuel E Duke

(57) ABSTRACT

A process for separating a mixture of components is disclosed. A liquid mixture is provided to a separation vessel substantially near a temperature at which a product component freezes. The liquid mixture comprises the product component and a carrier component. The product component and the carrier component are essentially immiscible substantially near the temperature. The liquid mixture is separated into two or more phases, the two or more phases comprising a product component-rich liquid phase and a product component-depleted liquid phase. In this manner, a mixture of components is separated.

6 Claims, 8 Drawing Sheets

101
Provide a warm liquid mixture to a separation vessel.

102
Cool the warm liquid mixture substantially near a temperature at which a product component in the liquid mixture freezes, forming an immiscible liquid mixture.

103
Separate the components into two phases comprising a product component-rich liquid phase and a product component-depleted liquid phase.

200

201
Provide a slurry stream to a separation vessel comprising a suspended solid and a carrier liquid.

202
Melt the suspended solid to form a liquid mixture substantially near the temperature at which the product component in the liquid mixture freezes.

203
Separate the two components into two or more phases comprising a product component-rich liquid phase and a product component-depleted liquid phase.

PROCESS FOR COMPONENT SEPARATION UTILIZING MISCIBILITY DEPRESSION NEAR A FREEZING POINT

This invention was made with government support under DE-FE0028697 awarded by The Department of Energy. The government has certain rights in the invention.

FIELD OF THE INVENTION

This invention relates generally to the field of separations. More particularly, we are interested in separating liquids by reduction of miscibility.

BACKGROUND

A solid crystallizes when it freezes in a solution, which involves molecules of one type falling into a regular orientation with one another to the exclusion of all different molecules. The thermal agitation of the molecules works against this tendency, and freezing occurs when the ordering forces of hydrogen bonding or other intermolecular forces overcome the disordering forces of thermal agitation. Similar intermolecular attractions can lead to the formation of two liquid phases if the intermolecular forces are large enough to exclude other molecules but still too small to completely overcome thermal agitation. Such miscibility gaps form over a broad temperature range when the molecules in a solution exhibit large differences in, for example, dipole moments or even shape and size. More similar liquid-phase molecules, normally partially or completely miscible, can also split into two phases as their temperature approaches the point at which a component freezes, which generally is lower than the pure component freezing temperature. While no liquid mixtures are ever completely immiscible, when a liquid mixture is substantially at the temperature at which a component freezes, the components in the mixture become essentially immiscible. In other words, their partial miscibility approaches zero as the temperature approaches the component freezing temperature. However, the inventors are unaware of any process currently utilizing these near freezing liquid-liquid interactions to separate otherwise partially or fully miscible liquids.

U.S. Pat. No. 3,653,222 to Blair, et al., teaches a method of freezing solution droplets and the like using immiscible refrigerants of differing densities. The invention includes the freezing of liquid dispersions, including dispersions on the ionic scale of salt solutions on through fluid colloidal systems. Appropriate materials that are soluble in a solvent for which two mutually immiscible, denser liquid refrigerants exist, and that are also individually immiscible with the solvent, may be processed. The present disclosure differs from this prior art disclosure in that the purpose of this prior art disclosure is to freeze liquid dispersions, not to separate components from each other nor to do liquid-liquid separations. This prior art disclosure is pertinent and may benefit from the methods disclosed herein and is hereby incorporated for reference in its entirety for all that it teaches.

SUMMARY

A process for separating a mixture of components is disclosed. The mixture comprises a product component and a carrier component. The mixture is brought substantially near a temperature at which the product component freezes such that the mixture becomes a liquid or remains a liquid. Substantially near the temperature is within 20 C above the temperature. The product component and the carrier component are essentially immiscible substantially near the temperature. The mixture is separated in a separation vessel into two or more liquid phases. The two or more liquid phases comprise a product component-rich liquid phase and a product component-depleted liquid phase. In this manner, the mixture of components is separated.

The mixture may be two liquid components that are partially miscible above the temperature at which the product component freezes.

The mixture may be formed by providing a slurry stream. The slurry stream may comprise a suspended solid and a carrier liquid. The suspended solid may comprise the product component and the carrier liquid may comprise the carrier component. The suspended solid may be melted substantially near the temperature to form a liquid mixture.

The mixture may further comprise a gas phase. The gas phase may comprise a vapor form of the product component, a vapor form of the carrier component, or a combination thereof. The gas phase may be not in equilibrium with the product component-rich liquid phase and the product component-depleted liquid phase due to slow transport between a bottom liquid phase and the gas phase. The gas phase may be substantially in equilibrium with the product component-rich liquid phase and the product component-depleted liquid phase. The separating step further may comprise separating the gas phase from the product component-rich liquid phase and the product component-depleted liquid phase. The separating step may be accomplished using a multi-phase separator.

The carrier component may comprise any compound or mixture of compounds with a freezing point below the freezing temperature.

The carrier component and the product component may differ in dipole moment, component solubility, size, shape, hydrogen bonding characteristics, densities, mutual affinities, or combinations thereof, wherein they are prone to form separate phases substantially near the freezing temperature.

The product component may comprise carbon dioxide, nitrogen oxide, sulfur dioxide, nitrogen dioxide, sulfur trioxide, hydrogen sulfide, hydrogen cyanide, water, hydrocarbons, particulates, mercury, other heavy metals, condensed organics, soot, inorganic ash components, biomass, salts, frozen condensable gases, frozen absorbed gases, impurities common to vitiated flows, impurities common to producer gases, impurities common to other industrial flows, or combinations thereof.

The vessel may promote a stable formation of two liquid phases by minimizing turbulence or other forms of mixing. The vessel may avoid the phases coming to complete equilibrium by minimizing molecular transport and mixing rates. The vessel may maximize mass and heat transfer coefficients between or among the two or more phases.

The separating step may be accomplished by a process comprising decanting, centrifuging, gravity settling, enhanced-gravity settling, and combinations thereof.

The carrier liquid may comprise a dissolved portion of the product component.

BRIEF DESCRIPTION OF THE DRAWINGS

In order that the advantages of the invention will be readily understood, a more particular description of the invention briefly described above will be rendered by reference to specific embodiments illustrated in the appended drawings. Understanding that these drawings depict only typical embodiments of the invention and are not therefore to be considered limiting of its scope, the invention will be described and explained with additional specificity and detail through use of the accompanying drawings, in which:

FIG. 2 shows a method for separating a mixture of components.

DETAILED DESCRIPTION

It will be readily understood that the components of the present invention, as generally described and illustrated in the Figures herein, could be arranged and designed in a wide variety of different configurations. Thus, the following more detailed description of the embodiments of the invention, as represented in the Figures, is not intended to limit the scope of the invention, as claimed, but is merely representative of certain examples of presently contemplated embodiments in accordance with the invention.

Figure 1:
FIG. 1 shows a method for separating a mixture of components.

Referring to FIG. 1, a method for separating a mixture of components is shown at 100, as per one embodiment of the present invention. A warm liquid mixture, comprising the product component and a carrier component, that is partially miscible is provided to a separation vessel 101. The warm liquid mixture is cooled substantially near the temperature at which a product component in the liquid mixture freezes, becoming an immiscible liquid mixture 102. The two components are essentially immiscible near the temperature. The two components are separated into two phases comprising a product component-rich liquid phase and a product component-depleted liquid phase 103. The phrase "substantially near the temperature" is defined as a temperature above and close enough to the freezing point temperature to cause the product component and the carrier component to be essentially immiscible. This is within 20 C above the temperature. In some embodiments, the temperature above and close enough to the freezing point is within 1 C above the freezing point. In other embodiments, the temperature above and close enough to the freezing point is within 5 C above the freezing point.

Referring to FIG. 2, a method for separating a mixture of components is shown at 200, as per one embodiment of the present invention. A slurry stream is provided, containing a suspended solid and a carrier liquid, to a separation vessel 201. The suspended solid comprises the product component. The carrier liquid comprises the carrier component. The suspended solid is melted in the separation vessel, forming a liquid mixture of the product component and the carrier component substantially near the temperature at which the product component in the liquid mixture freezes 202. The two components are essentially immiscible substantially near the temperature. The two components are separated into two or more phases comprising a product component-rich liquid phase and a product component-depleted liquid phase 203. The phrase "substantially near the temperature" is defined as a temperature above and close enough to the freezing point temperature to cause the product component and the carrier component to be essentially immiscible. This is within 20 C above the temperature. In some embodiments, the temperature above and close enough to the freezing point is within 1 C above the freezing point. In other embodiments, the temperature above and close enough to the freezing point is within 5 C above the freezing point.

Figure 3:
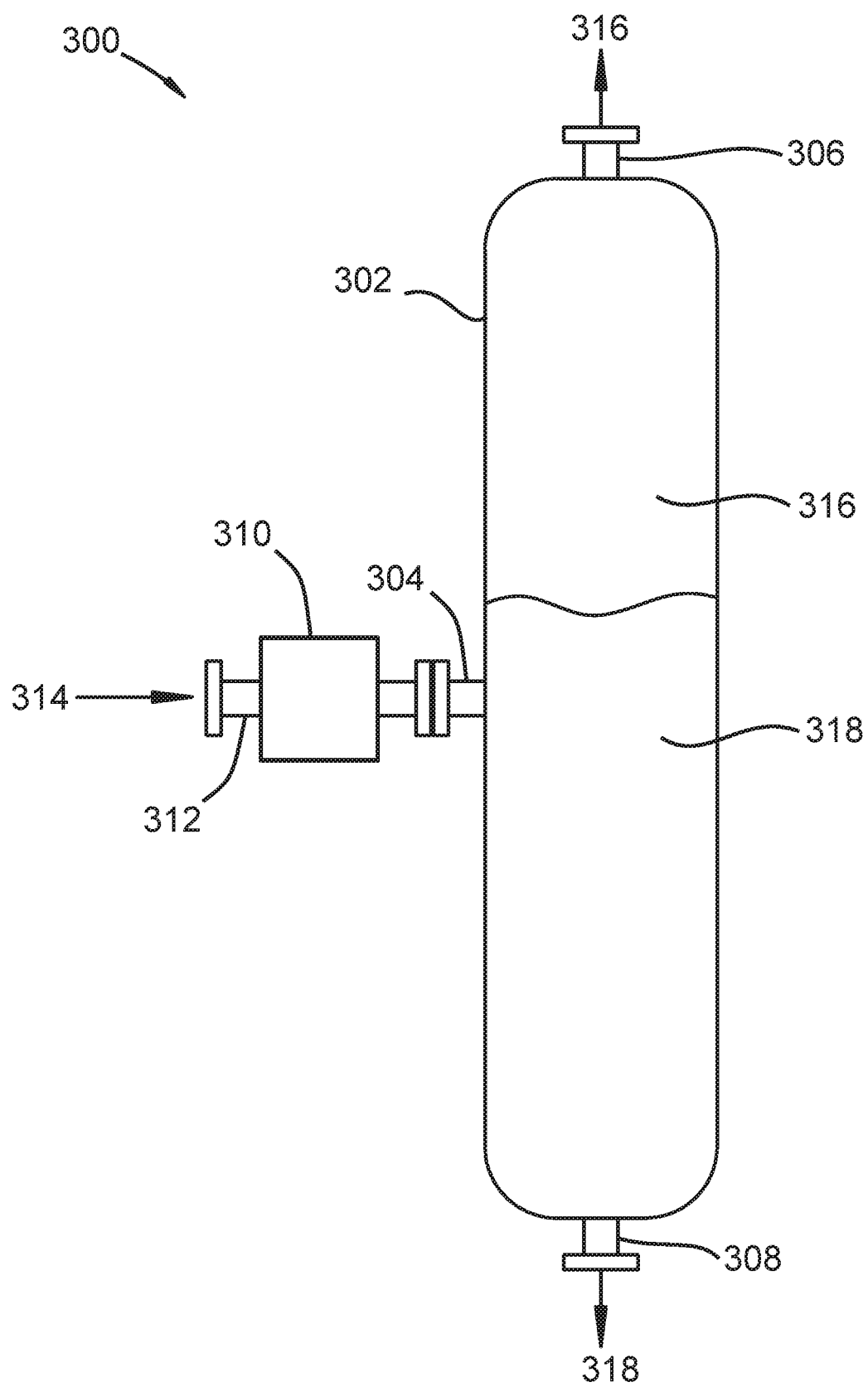
FIG. 3 shows a cross-sectional view of a cooler and a vertical liquid-liquid separator for separating a mixture of components.

Referring to FIG. 3, a cross-sectional view of a cooler and vertical liquid-liquid separator for separating a mixture of components is shown at 300, as per one embodiment of the present invention. Warm liquid mixture 314, a partially miscible mixture comprising a product component and a carrier component, is provided to cooler 310 through cooler inlet 312. Cooler 310 cools warm liquid mixture 314, forming a liquid mixture that passes through separator inlet 304 into separator 302. The liquid mixture is substantially near the temperature at which the product component freezes. In other words, the liquid mixture is close, but not at the freezing point of the product component. This near approach to the freezing point causes the two components to become essentially immiscible in each other, causing the two components to separate into product component-rich liquid phase 316 and product component-depleted liquid phase 318. Separator 302 separates these components, with product component-rich liquid phase 318 removed through top outlet 306 and product component-depleted liquid phase 318 removed through bottom outlet 308. In some embodiments, the phases have opposite densities, resulting in product component-rich liquid phase 316 being below product component-depleted liquid phase 318. The phrase "substantially near the temperature" is defined as a temperature above and close enough to the freezing point temperature to cause the product component and the carrier component to be essentially immiscible. This is within 20 C above the temperature. In some embodiments, the temperature above and close enough to the freezing point is within 1 C above the freezing point. In other embodiments, the temperature above and close enough to the freezing point is within 5 C above the freezing point.

Figure 4:
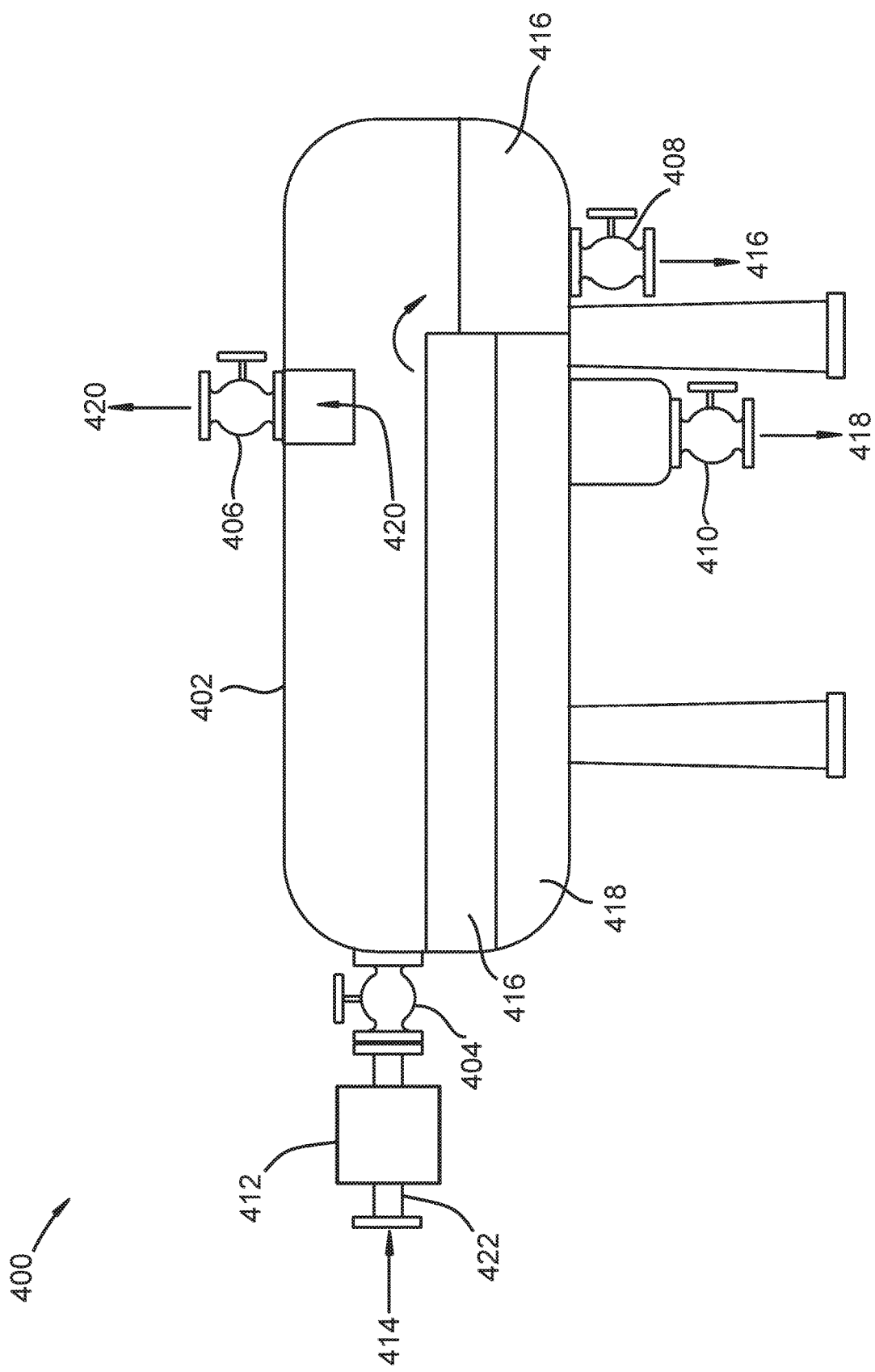
FIG. 4 shows a cross-sectional view of a cooler and a multi-phase separator for separating a mixture of components.

Referring to FIG. 4, a cross-sectional view of a cooler and multi-phase separator for separating a mixture of components is shown at 400, as per one embodiment of the present invention. Warm liquid mixture 414, comprising a product component and a carrier component, is provided to cooler 412 through cooler inlet 422. Cooler 412 cools warm liquid mixture 414, forming a liquid mixture that passes through separator inlet 404 into separator 402. Liquid mixture 414 is substantially near the temperature at which the product component freezes. In other words, liquid mixture 414 is close, but not at the freezing point of the product component. This near approach to the freezing point causes the two components to become essentially immiscible in each other, causing the two components to separate into product component-rich liquid phase 416, product component-depleted liquid phase 418, and gas phase 420. Gas phase 420 is removed through gas outlet 406, product component-rich liquid phase 416 is removed through first liquid outlet 408, and product component-depleted liquid phase 418 is removed through second liquid outlet 410. In some embodiments, the phases have opposite densities, resulting in product component-rich liquid phase 416 being below product component-depleted liquid phase 418. The phrase "substantially near the temperature" is defined as a temperature above and close enough to the freezing point temperature to cause the product component and the carrier component to be essentially immiscible. This is within 20 C above the temperature. In some embodiments, the temperature above and close enough to the freezing point is within 1 C above the freezing point. In other embodiments, the temperature above and close enough to the freezing point is within 5 C above the freezing point.

Figure 5:
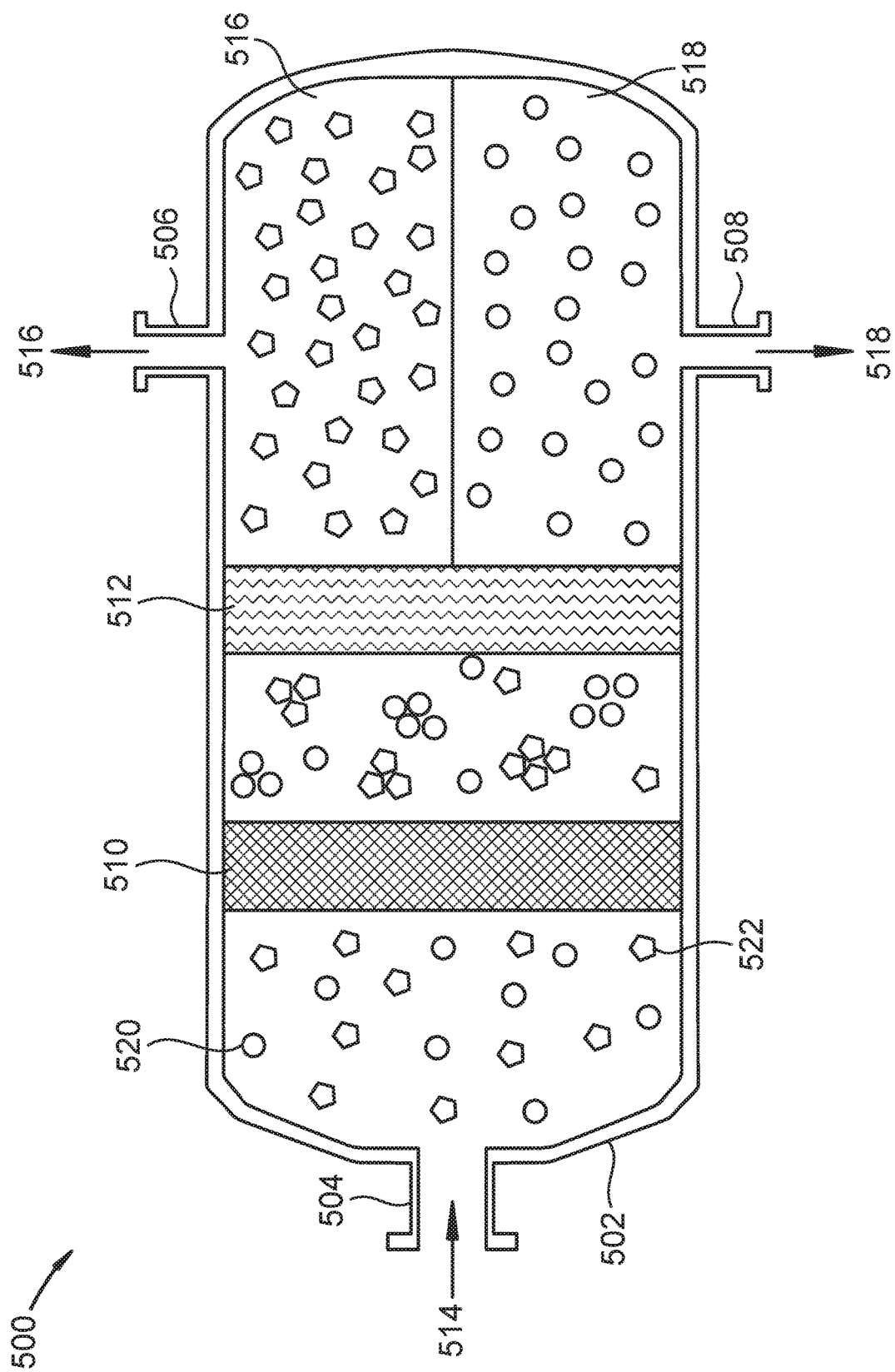
FIG. 5 shows a cross-sectional view of a coalescing separator for separating a mixture of components.

Referring to FIG. 5, a cross-sectional view of a coalescing separator for separating a mixture of components is shown at 500, as per one embodiment of the present invention. A warm liquid mixture is provided to a cooler (not shown) and cooled to form liquid mixture 514, comprising product component 522 and carrier component 520. Liquid mixture 514 is provided to separator 502 through inlet 504. Liquid mixture 514 is substantially near the temperature at which product component 522 freezes. In other words, liquid mixture 514 is close, but not at the freezing point of product component 522. This near approach to the freezing point causes the two components to become essentially immiscible in each other. This immiscibility combined with flow through mesh coalescer 510 and plate coalescer 512 causes the two components to separate into product component-rich liquid phase 516 and product component-depleted liquid phase 518. Product component-rich liquid phase 516 is removed through top outlet 506 and product component-depleted liquid phase 518 is removed through bottom outlet 508. In some embodiments, the phases have opposite densities, resulting in product component-rich liquid phase 516 being below product component-depleted liquid phase 518. The phrase "substantially near the temperature" is defined as a temperature above and close enough to the freezing point temperature to cause the product component and the carrier component to be essentially immiscible. This is within 20 C above the temperature. In some embodiments, the temperature above and close enough to the freezing point is within 1 C above the freezing point. In other embodiments, the temperature above and close enough to the freezing point is within 5 C above the freezing point.

Figure 6:
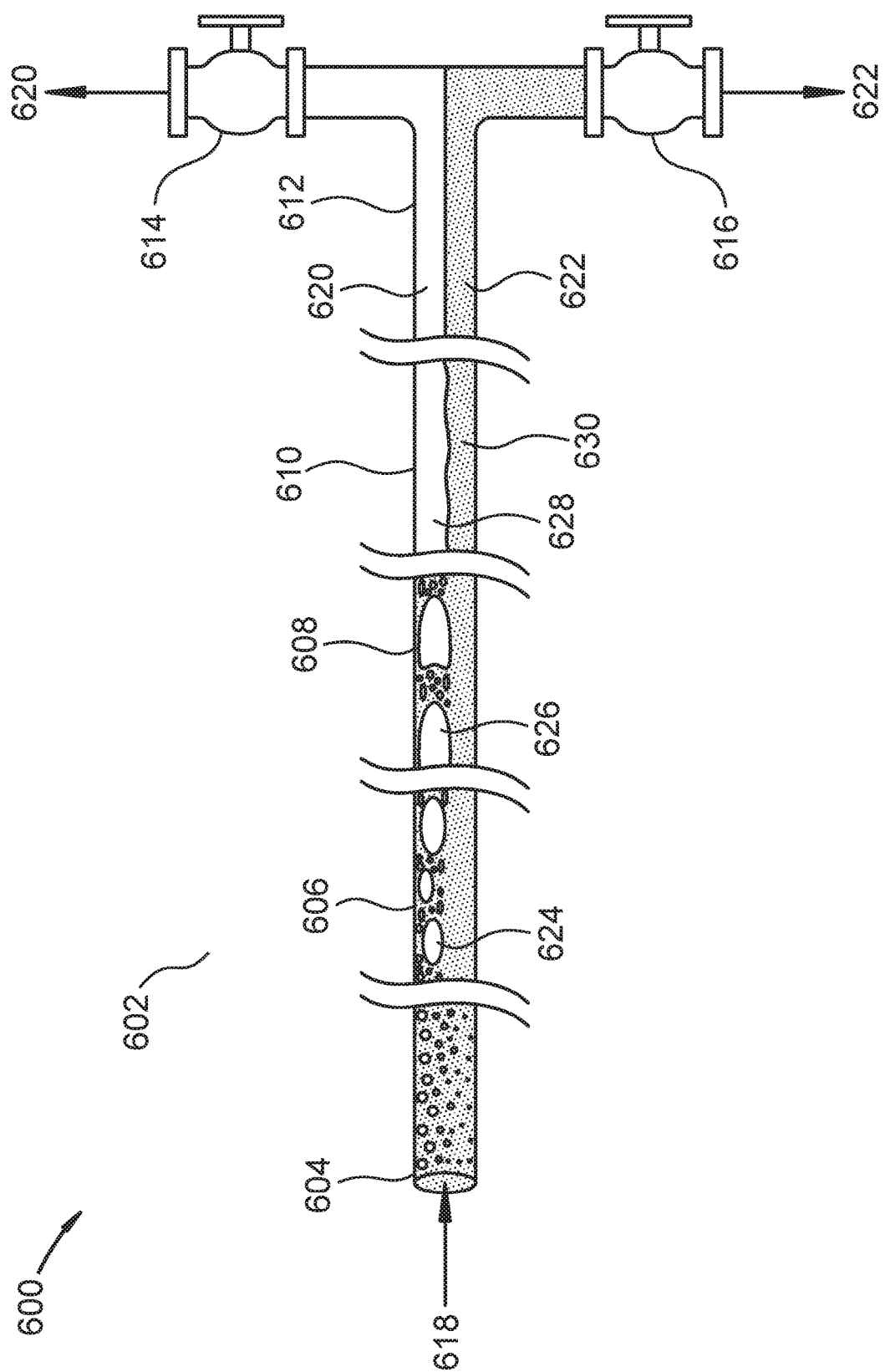
FIG. 6 shows a cross-sectional view of a pipe separator for separating a mixture of components.

Referring to FIG. 6, a cross-sectional view of a pipe separator for separating a mixture of components is shown at 600, as per one embodiment of the present invention. A warm liquid mixture is provided to a cooler (not shown) to form liquid mixture 618, comprising a product component and a carrier component. Liquid mixture 618 is provided to pipe separator 602 through inlet section 604. Liquid mixture 618 is substantially near the temperature at which the product component freezes. In other words, liquid mixture 618 is close, but not at the freezing point of the product component. This near approach to the freezing point causes the two components to become essentially immiscible in each other, causing the two components to separate through pipe separator 602 into product component-rich liquid phase 620 and product component-depleted liquid phase 622. The separation occurs in stages through the pipe, enhanced by the length, allowing for laminar flow to develop and separation to fully occur. Inlet section 604 has product component and carrier component dispersed in each other. In coalescing section 606, the product component begins to coalesce into large bubbles 624 of the product component. In slug flow section 608, large bubbles 624 come together to form slugs 626 of the product component. In wavy flow section 610, slugs 626 have combined and settled into nearly laminar layers 628 and 630. In stratified flow section 612, the two phases have fully formed under laminar flow conditions. Product component-rich liquid phase 620 is removed through top outlet 614 and product component-depleted liquid phase 622 is removed through bottom outlet 616. In some embodiments, the phases have opposite densities, resulting in product component-rich liquid phase 620 being below product component-depleted liquid phase 622. The phrase "substantially near the temperature" is defined as a temperature above and close enough to the freezing point temperature to cause the product component and the carrier component to be essentially immiscible. This is within 20 C above the temperature. In some embodiments, the temperature above and close enough to the freezing point is within 1 C above the freezing point. In other embodiments, the temperature above and close enough to the freezing point is within 5 C above the freezing point.

Figure 7:
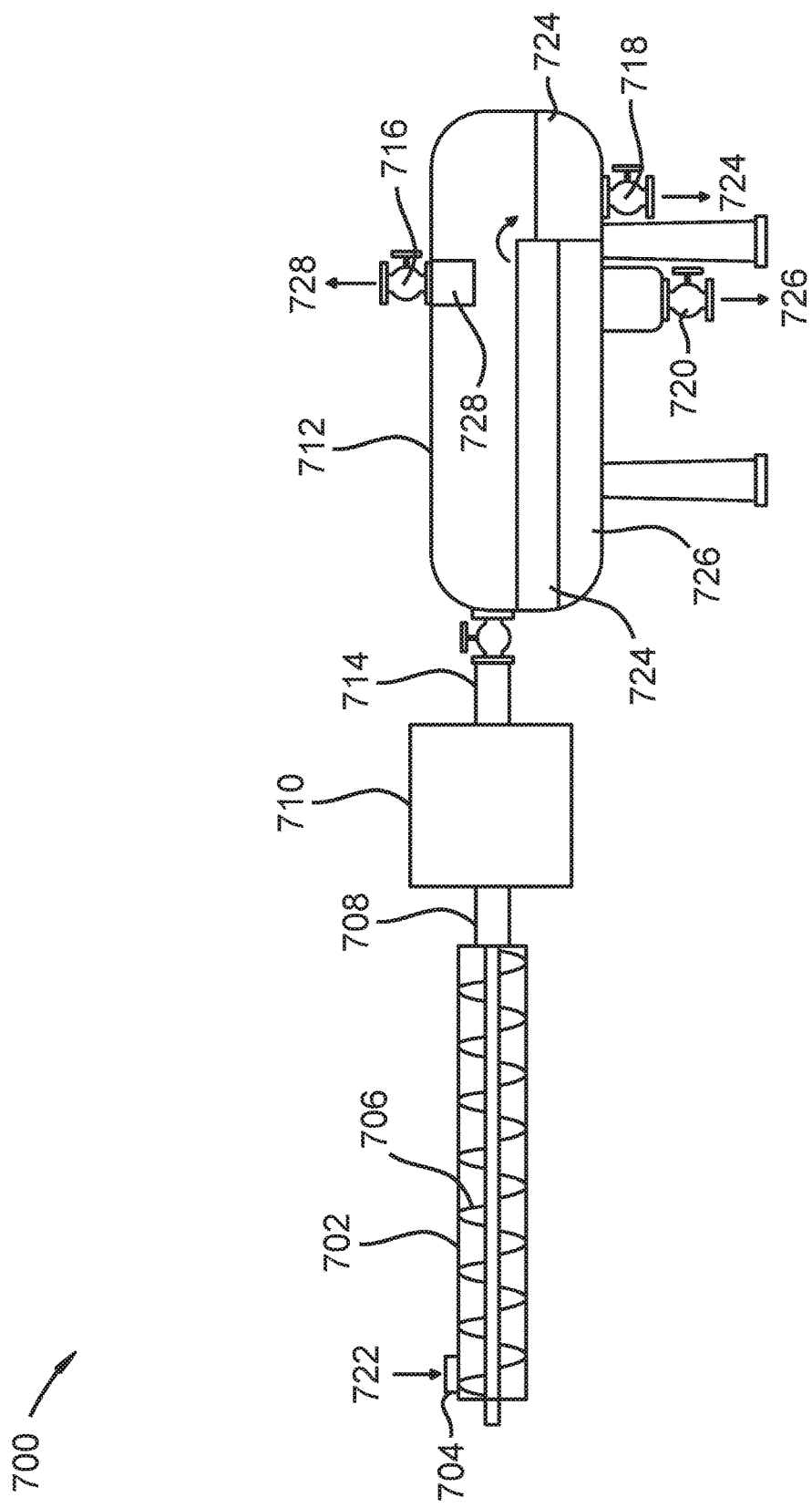
FIG. 7 shows a cross-sectional view of a screw compressor, melter, and separator for separating a mixture of components.

Referring to FIG. 7, a cross-sectional view of a screw compressor, melter, and separator for separating a mixture of components is shown at 700, as per one embodiment of the present invention. Screw compressor 702 comprises screw inlet 704, screw 706, and screw outlet 708. Screw outlet 708 feeds melter 710. Melter 710 feeds separator inlet 714. Separator 712 consists of separator inlet 714, gas outlet 716, first liquid outlet 718, second liquid outlet 720. Slurry stream 722, comprising a suspended solid and a carrier liquid, is provided to screw compressor 702 through screw inlet 704. The suspended solid comprises a product component. The carrier liquid comprises the carrier component. The slurry stream is compressed through screw compressor 702 and is passed through screw outlet 708 into melter 710. Melter 710 melts the suspended solids substantially near the temperature at which the product component freezes, producing a liquid mixture. In other words, the liquid mixture is above but not at the freezing point of the product component. This near approach to the freezing point causes the two components to become essentially immiscible in each other, causing the two components to separate into product component-rich liquid phase 724, product component-depleted liquid phase 726, and gas phase 728. Gas phase 728 is removed through gas outlet 716, product component-rich liquid phase 724 is removed through first liquid outlet 718, and product component-depleted liquid phase 726 is removed through second liquid outlet 720. In some embodiments, the phases have opposite densities, resulting in product component-rich liquid phase 724 being below product component-depleted liquid phase 726. In some embodiments, the walls of screw compressor 702 further comprise pores that allow a portion of the carrier liquid to pass through but prevent passage of the suspended solids. In some embodiments, the carrier liquid further comprises a dissolved portion of the product component. The phrase "substantially near the temperature" is defined as a temperature above and close enough to the freezing point temperature to cause the product component and the carrier component to be essentially immiscible. This is within 20 C above the temperature. In some embodiments, the temperature above and close enough to the freezing point is within 1 C above the freezing point. In other embodiments, the temperature above and close enough to the freezing point is within 5 C above the freezing point.

Figure 8:
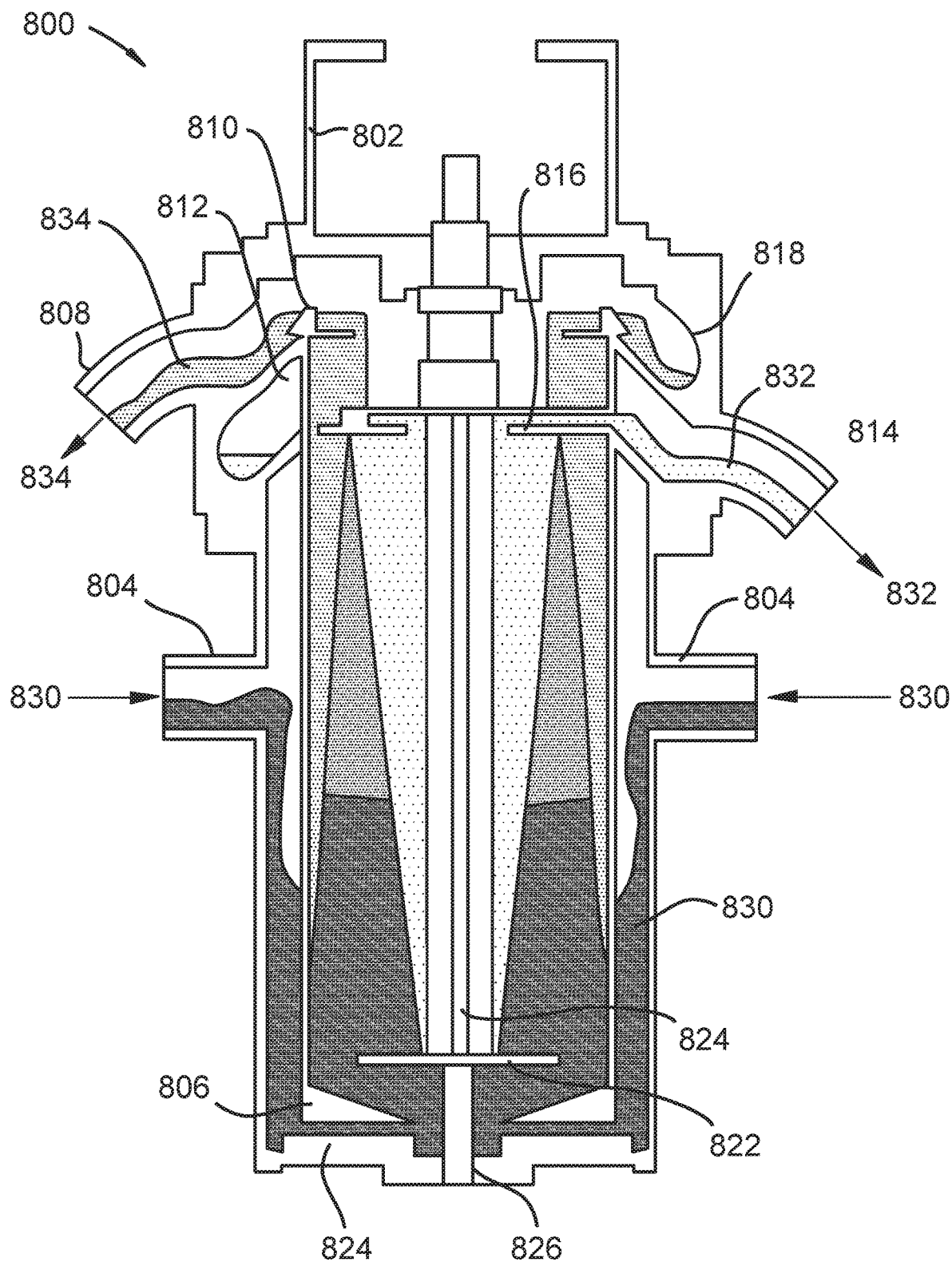
FIG. 8 shows a cross-sectional view of a centrifugal separator for separating a mixture of components.

Referring to FIG. 8, a cross-sectional view of a centrifugal separator for separating a mixture of components is shown at 800, as per one embodiment of the present invention. Centrifugal separator 802 comprises inlets 804, rotor 806, heavier-phase outlet 808, heavier-phase weir 810, heavier-phase collector 812, lighter-phase outlet 814, lighter-phase weir 816, lighter-phase collector 818, bottom vanes 820, diverter disc 822, separation vanes 824, and rotor inlet 826. A warm liquid mixture is provided to a cooler (not shown) forming liquid mixture 830, comprising a product component and a carrier component. Liquid mixture 830 enters centrifugal separator 802 through inlets 804. Liquid mixture 830 is substantially near the temperature at which the product component freezes. In other words, liquid mixture 830 is close, but not at the freezing point of the product component. This near approach to the freezing point causes the two components to become essentially immiscible in each other. The centrifugal action of rotor 806 causes liquid mixture 830 to separate into product component-rich liquid phase 832 and product component-depleted liquid phase 834. Product component-rich liquid phase 832 is removed through lighter-phase outlet 814. Product component-depleted liquid phase 834 is removed through heavier-phase outlet 810. In some embodiments, the phases have opposite densities, resulting in product component-rich liquid phase 832 being lighter than product component-depleted liquid phase 834. The phrase "substantially near the temperature" is defined as a temperature above and close enough to the freezing point temperature to cause the product component and the carrier component to be essentially immiscible. This is within 20 C above the temperature. In some embodiments, the temperature above and close enough to the freezing point is within 1 C above the freezing point. In other embodiments, the temperature above and close enough to the freezing point is within 5 C above the freezing point.

In some embodiments, the carrier component comprises any compound or mixture of compounds with a freezing point below the temperature. In some embodiments, the carrier component and the product component differ in dipole moment, component solubility, size, shape, hydrogen bonding characteristics, densities, mutual affinities, or combinations thereof, wherein they are prone to form separate phases substantially near the temperature. In some embodiments, the product component comprises carbon dioxide, nitrogen oxide, sulfur dioxide, nitrogen dioxide, sulfur trioxide, hydrogen sulfide, hydrogen cyanide, water, hydrocarbons, mercury, condensed organics, or combinations thereof.

In some embodiments, the vessel promotes a stable formation of two liquid phases by minimizing turbulence or other forms of mixing. In some embodiments, the vessel avoids the phases coming to complete equilibrium by minimizing molecular transport and mixing rates. In some embodiments, the vessel maximizes mass and heat transfer coefficients between or among the two or more phases.

In some embodiments, the separating step is accomplished by a process comprising decanting, centrifuging, gravity settling, enhanced-gravity settling, and combinations thereof.

In some embodiments, the gas phase comprises a vapor form of the product component, a vapor form of the carrier component, or a combination thereof. In some embodiments, the gas phase is not in equilibrium with the product component-rich liquid phase and the product component-depleted liquid phase due to slow transport between a bottom liquid phase and the gas phase. In some embodiments, the gas phase is substantially in equilibrium with the product component-rich liquid phase and the product component-depleted liquid phase. In some embodiments, the separating step further comprises separating the gas phase from the product component-rich liquid phase and the product component-depleted liquid phase. In some embodiments, the separating step is accomplished using a multiphase separator.

In some embodiments, the suspended solid comprises carbon dioxide, nitrogen oxide, sulfur dioxide, nitrogen dioxide, sulfur trioxide, hydrogen sulfide, hydrogen cyanide, water, hydrocarbons, particulates, mercury, other heavy metals, condensed organics, soot, inorganic ash components, biomass, salts, frozen condensable gases, frozen absorbed gases, impurities common to vitiated flows, impurities common to producer gases, impurities common to other industrial flows, or combinations thereof.

In some embodiments, the gas phase is produced from melting the suspended solids.

The invention claimed is:

1. A process for separating a liquid mixture of components comprising:
    providing the liquid mixture comprising a product component and a carrier component, the product component and the carrier component being partially miscible at a first temperature that is more than 20° C. above a second temperature at which the product component freezes;
    bringing the liquid mixture substantially near the second temperature at which the product component freezes using a cooler such that the mixture remains a liquid, the product component and the carrier component being essentially immiscible substantially near the second temperature, wherein substantially near the second temperature is within 20° C. above the second temperature; and,
    separating the mixture in a separation vessel into two or more liquid phases, the two or more liquid phases comprising a product component-rich liquid phase and a product component-depleted liquid phase;
    whereby the liquid mixture of components is separated.

2. The process of claim 1, providing the carrier component comprising any compound or mixture of compounds with a freezing point below the second temperature.

3. The process of claim 1, providing the carrier component and the product component differing in dipole moment, component solubility, size, shape, hydrogen bonding characteristics, densities, mutual affinities, or combinations thereof, wherein they are prone to form separate phases substantially near the temperature.

4. The process of claim 1, providing the product component comprising carbon dioxide, nitrogen oxide, sulfur dioxide, nitrogen dioxide, sulfur trioxide, hydrogen sulfide, hydrogen cyanide, water, hydrocarbons, mercury, condensed organics, or combinations thereof.

5. The process of claim 1, providing the separation vessel promoting a stable formation of two liquid phases by minimizing turbulence or other forms of mixing.

6. The process of claim 1, wherein the separating step is accomplished by a process comprising decanting, centrifuging, gravity settling, enhanced-gravity settling, and combinations thereof.

* * * * *